UNITED STATES PATENT OFFICE.

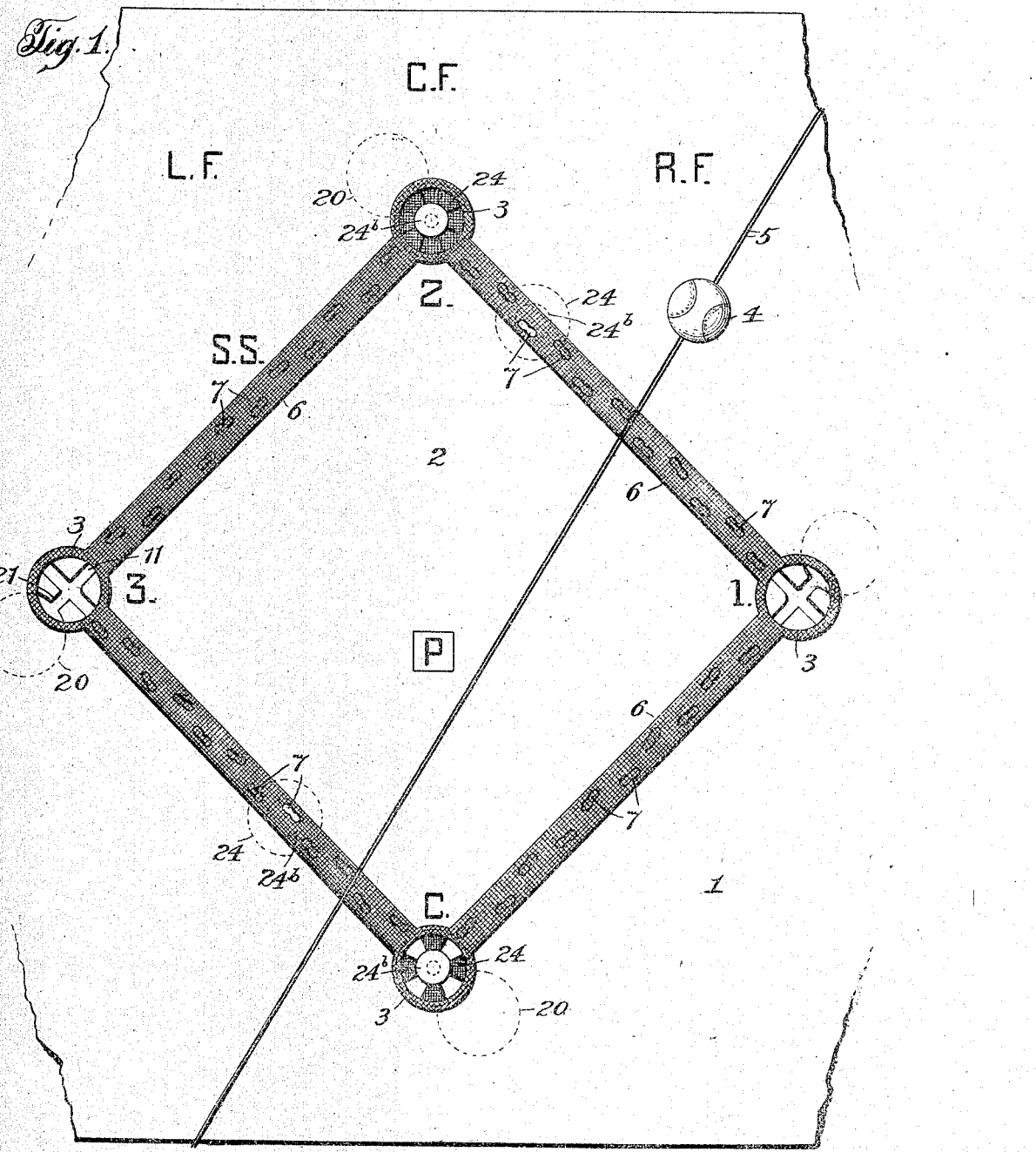

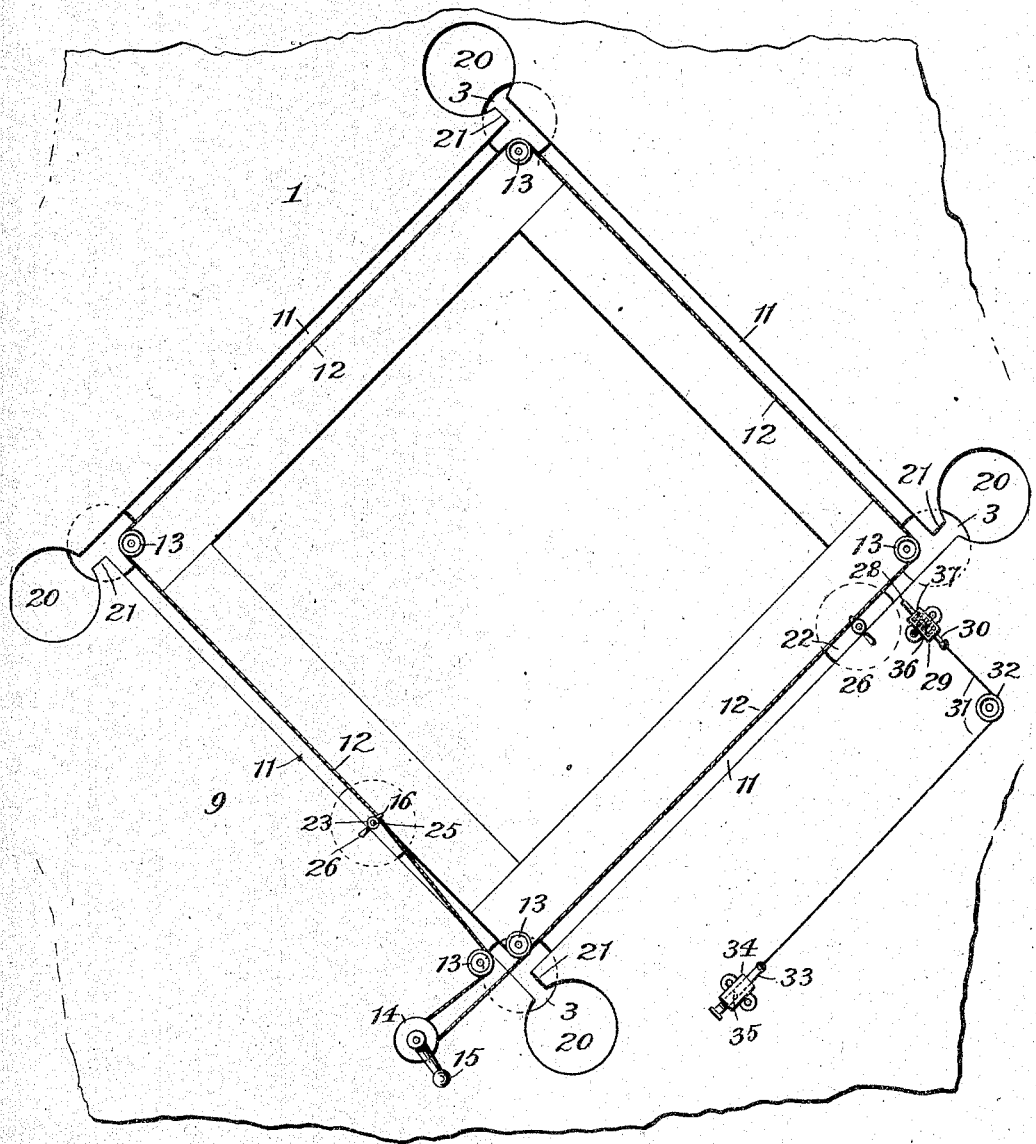

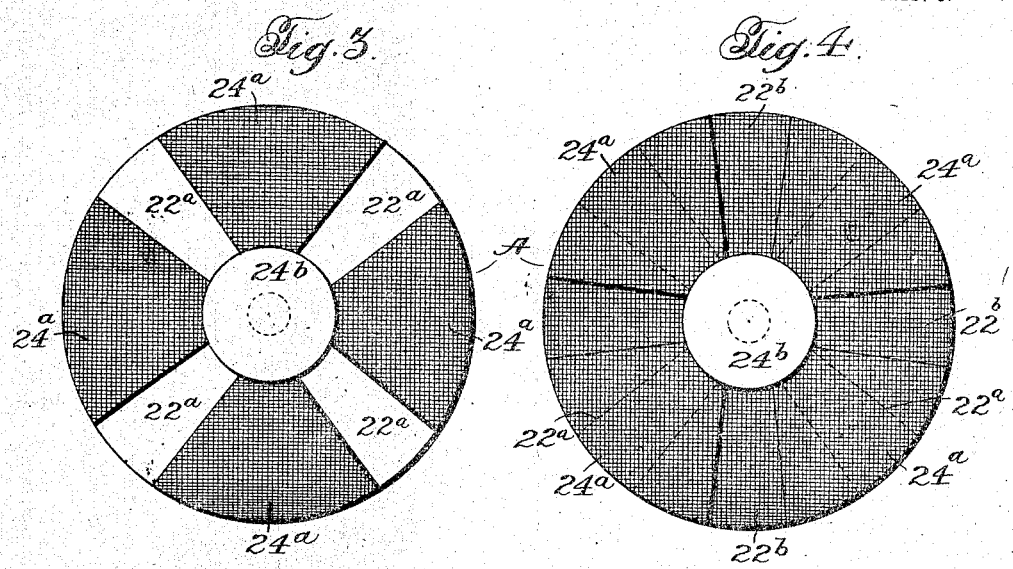
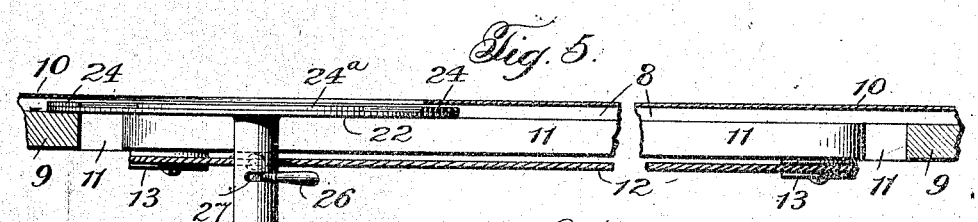
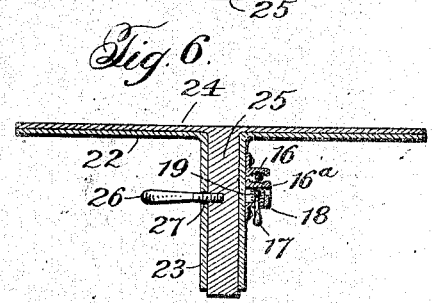
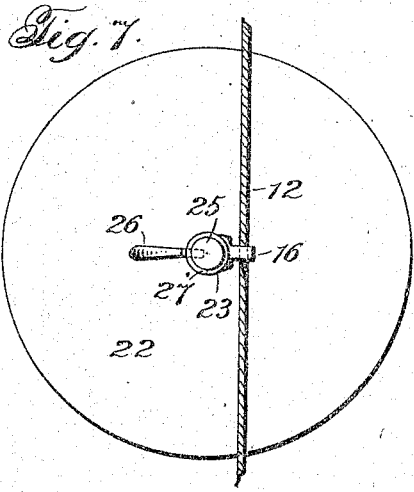

JOHN WALLACE BAKER, OF STAMFORD, CONNECTICUT, ASSIGNOR TO MABEL CRANE BAKER, OF STAMFORD, CONNECTICUT.

BULLETIN-BOARD.

1,171,830. Specification of Letters Patent. Patented Feb. 15, 1916.

Application filed November 25, 1912. Serial No. 733,528.

*To all whom it may concern:*

Be it known that I, JOHN W. BAKER, citizen of the United States, residing at Stamford, in the county of Fairfield and State of Connecticut, have invented certain new and useful Improvements in Bulletin-Boards, of which the following is a specification, reference being had therein to the accompanying drawing.

This invention relates to bulletin boards of a character adapted to be placed in front of newspaper offices, on theater stages, and other places for the purpose of communicating news to the public, and while useful in other respects, is more especially designed for the purpose of graphically reproducing the progress of base-ball, foot-ball or other games in a manner whereby each play of the actual game may be readily followed and understood.

In the illustrative embodiment of the invention shown and described herein, the invention takes the form of a base-ball bulletin, though many other adaptations are within the contemplation of the invention.

In carrying out the principles of the invention, I provide a bulletin board or other surface having thereon a field representation, and indicating means viewable from the front of the board and movable from place to place about the field to indicate the progress of a factor in the game, said indicating means offering substantially no obstruction beyond the front surface of the board. In this connection, the invention, while not limited to such use, is especially applicable and useful in connection with a bulletin board having associated therewith a ball or other indicating device movable over the front surface of the board to indicate movement of the ball over the field, in which event the indicating means, just described, is utilized to indicate the progress of the player in conjunction with the progress of said ball indicator. In this manner, the public is kept advised as to the movement of the ball, and as to the relative movement of a player through the game.

Further, the invention includes novel and improved indicating means preferably taking the form of foot prints, tracks, or the like, projecting over the field, thereby indicating the progress of a player in action, and thus rendering the exhibition more realistic, while at the same time increasing the interest and enthusiasm of the observers.

More particularly the invention comprises in combination with a board of the general character illustrated in the patent granted to George H. Parker, No. 1,043,536, November 5, 1912, wherein is shown a bulletin board having on one surface a field representation and an indicator movable over the front surface thereof to indicate the progress of a ball, of auxiliary indicating means to illustrate the progress of the players with relation to the ball, said parts being constructed and arranged with a view to simplicity in construction, efficiency and durability in operation, and cheapness in cost of production.

Still further, the invention embodies a novel construction and arrangement of parts which, in operation, will be pleasing and unhurtful to the eye of the observer, thereby overcoming certain defects in this respect at present existing in certain types of bulletin boards now in vogue.

Other and further improvements and novel details in the construction and arrangement of parts will be more fully brought out hereinafter, and for a comprehensive understanding of the invention, the description to follow should be considered in connection with the accompanying drawings which form a part hereof, and wherein is disclosed, for the purpose of illustration, a convenient and satisfactory embodiment of the invention.

In the drawings: Figure 1 is a front elevation of the board broken away with my improvements applied; Fig. 2 is a rear view; Figs. 3 and 4 are detail views of the indicators removed, the same being enlarged and shown in reverse positions; Fig. 5 is an enlarged detail view of the conveyer mechanism for the indicator and associated parts; Fig. 6 is a transverse section of the indicator and Fig. 7 is a rear view of the indicator.

With more particular reference to the drawings, 1 is a board of any suitable construction or material, the same having upon the front surface thereof, a field representation, such as a base-ball diamond, and bearing such indicating data with reference to the position of the players, etc., as may be desired. The diamond proper is indicated by the numeral 2, and the bases by the numeral 3, the board preferably being cut out or having openings at the base portions whereby to indicate therethrough whether or not the player is "safe" at the particular base. Arranged to play over the field is a suitable indicator to show the progress of a ball over the field, the indicator being given the numeral 4 and connected through the medium of wires or the like 5, with suitable operating mechanism at the rear of the board, it being noted in this connection that the operating mechanism is preferably of a construction whereby the ball may be moved to any portion of the field, as desired, whereby to indicate the movement of the ball in the game which is being reproduced. In this connection, a suitable mechanism for moving the ball is illustrated in the patent to Parker, above referred to, and need not be specifically shown or described herein.

It is desirable to show by mechanical means the progress of the players with relation to the movement of the ball; for instance say a ball is hit by the batter into one of the positions on the field, interest of the observer is increased providing the movement of the batter can be closely followed with relation to the ball. To this end, the board is of such construction that while the ball indicator is moved in the fielding thereof, the player is shown in a novel and highly realistic manner in his movement from the home plate to the first base, and subsequently to the other bases, provided he reaches the first base before the ball. In this way also the observer need only follow the relative movement of the ball and the player to ascertain whether or not the player is "safe" or "out", and auxiliary data giving this information to the public may be dispensed with.

The means for illustrating the progress of the player between the bases is preferably of a character to render as realistic as possible the actual appearance of a player in motion. In the illustrative embodiment of this feature of the invention, I accomplish the desired result through the medium of a series or line of foot-print representations substantially normally concealed or invisible, and means for successively bringing visibly to view, successive prints of the series. To illustrate, say a player has hit the ball, his progress from the home plate to first base will be indicated by bringing into view, the outline or print of a foot adjacent the home plate and extending in the general direction of the path from the home plate to the first base, and thereupon, succeeding prints will be brought to light until the player is seen to have arrived at the base. Any means or mechanism for attaining this highly interesting and important factor of the game is within the contemplation and scope of the invention.

In the present specific embodiment, the front surface of the board is provided along the several paths 6, projecting between the bases, with cut out parts or openings suitably spaced from one another and taking the form of the general outline of a foot or foot print 7. These feet or print representations 7 preferably do not project entirely through the board, and the surface of the board therebeneath is preferably colored substantially similar to the color of the front surface of the board along the paths between the bases, to the end that the said foot print outline will be substantially invisible a short distance from the board. A channel 8 is interposed between the front and rear surfaces of the board, and such channel may be suitably formed by constructing the board with a back portion 9 and a cover or plate forming the front surface 10, the latter being suitably spaced from the rear surface as by spacing members of any desired construction.

Arranged in the rear surface of the board are a series of guide grooves 11 projecting between the various points where it is desired to indicate the progress of the player. In the form illustrated, these grooves follow the general outline of the diamond, that is to say, they follow the paths between the bases, though it is to be noted that they may be arranged in other positions about the field to indicate the progress of a player or other factor over the field. The grooves 11 preferably do not extend through the front surface of the board, but they connect with the channel 8 interposed between the front and rear surfaces thereof.

Arranged to move in the channel 8 is a suitable indicator A to be more specifically referred to hereinafter, but preferably having a portion thereof toward the front of the board of a color contrasting with the general color of the path between the bases, whereby when the indicator is positioned in the channel behind any particular foot print 7, said print will be brought to light or to view at the front of the board, the indicator forming, in this connection, an illuminant for the foot print representations. A preferred means for imparting movement to the indicator in the channel comprises an endless carrier 12, which latter may be constructed of belting, rope, chain, wire, or the like, the carrier 12 being mounted upon suitable pulleys 13 at the rear of the board and following the general outline of the diamond, as more clearly illustrated in Fig. 2. An operating wheel or pulley 14 upon which the carrier 12 moves and from which the carrier receives its motion, is positioned at any convenient point for the operator, preferably to the side of the home plate, and having connected thereto a suitable operating handle 15 of any desired contsruction. It will be observed that as the handle is rotated, endwise movement is given to the carrier member 12, and a movement therewith is imparted to the indicator A along the path between the bases, to the end that succeeding prints are brought to light in the manner above described. In this connection, it is desirable that the indicator or indicators be readily releasable from the conveyer, since, say a player is shown to have gone from home plate to first base, and to have been retired at first base, the indicator may be removed from the carrier and brought back into position to show the progress of the next succeeding player from the home plate to first base. The means for connecting the indicator to the carrier preferably takes the form of coöperating jaws 16 and 16$^a$ relatively movable, the movable one 16$^a$ having a suitable operating pintle or knob piece 17 loosely passing through a guide 18 on a projection or stem of the indicator.

A spring 19 is interposed between the guide 18 and the movable jaw 16$^a$, whereby to normally force said jaws together or into a position to grasp the conveyer 12. It is noted in this connection that by grasping the knob 17 and moving the jaw 16$^a$ against action of the spring, the indicator may be applied to or released from the carrier at any part thereof. In order that the indicator may be inserted and removed at the desired point, say at any particular base at which the player has been retired, and this without making it necessary for the operator to go in front of the board or otherwise interrupt or obscure the view at the front of the board, I preferably provide, adjacent each base, at the rear of the board, an enlarged opening 20 preferably of a diameter considerably greater than the diameter of the indicator A, the said opening not projecting entirely through the board but communicating with the channel 8 and with the grooves 11 as by a groove 21 extending in the same general direction as one of the grooves 11. In this way, the operator may grasp the indicator by its projection or stem, and insert the same through the opening 20 at the rear of the board and move the same into the channel, the groove 21 acting as a guide in this connection, and when in proper position, the indicator is connected to the carrying member 12 in the manner previously described. Likewise, as the indicator reaches any particular base, the same may be removed in a similar manner as is obvious.

In order to indicate whether or not a player is "safe" at any particular base, I preferably take advantage of the indicator A before referred to, and to this end, the indicator is conveniently constructed as follows: 22 is a disk shaped-member having projecting from the rear surface thereof a hollow post or stem 23. Superimposed upon said disk 22 is an auxiliary disk 24 having projecting from the rear surface thereof a central stem or post 25 loosely passing through a central opening in the under disk 22, and loosely sleeved in the first mentioned stem or post 23. In this way, the disks are relatively movable, that is to say, the upper one may rotate relative to the lower one in the bearing formed by the post 23. A suitable operating handle for moving the movable disk 24 is shown at 26, the same connecting with the post 25 and passing through a laterally extending guide way 27, in the sleeve post 23. The upper disk 24 preferably takes the form of wings 24$^a$ connecting with a central circular part 24$^b$, which latter is colored in contrast to the color of the paths between the bases, and which said central part is of a diameter to project over any particular print opening in the pathway. Conveniently, for illustration, the pathway may be so colored as to have a brown or sandy appearance to imitate the appearance of the path of the playing field, and the central part in contrast thereto may be colored in white as illustrated in the drawing. The wings 24$^a$ projecting from the circular part 24$^b$ of the upper disk 24 are preferably colored in contrast to the central portions 24$^b$, say in black, as illustrated in the drawings. The upper surface of the under disk 22 will also have portions in contrasting colors, say white 22$^a$ and black 22$^b$ so that in the rotary movement of the plate in one direction, the limit of which movement is covered by the length of the guide-way 27, the colored portion 22$^a$ of the under plate will be in contrast with the colored portion 24$^a$ of the upper plate, thereby indicating that the player is "safe," while in the reverse position of said parts, the colored portion 22$^b$ of the lower plate will be of the same color as the colored portion 24$^a$ of the upper plate, thus giving to the indicator a general darkened appearance except at the central part 24$^b$, thereby indicating that the player is "out." In order that a considerable portion of the indicator may show through the base portions, the openings 3 are enlarged with respect to the width of the path between the bases. If desired, of course the indicator may be operated by hand along the pathways and also the coöperating disks of the indicators may be relatively moved by hand at the base positions to indicate the status of the player at this point. However, it is contemplated by the present invention also to cause the disk members of the indicators to automatically actuate upon reaching the particular base. A convenient method of accomplishing this feature of the invention is to provide, say at each base position, and to the rear of the front surface, a spring actuated abutment 28, the free end of which is adapted to project in the path of the operating handle 26, whereby as the indicator is moved along the groove or guide-way 11, the handle 26 thereof which projects through the groove will be brought into contact with the abutment 28, thereby turning the post 25 in the sleeve 23 and moving therewith the connected disk 24. Since, in the majority of cases, the player is retired, the indicating disk will normally be in position to indicate "out," when it arrives at a particular base, and, therefore, it is desirable to provide means for normally holding the indicating actuating mechanism or abutment 28 out of the path of the operating handle 26. To this end, the abutment 28 is slidably mounted in a suitable housing or guide way 29 fixed to the rear surface of the board, and projecting through the end thereof at 30 for connection with a suitable operating member 31, conveniently taking the form of a cord or the like, the latter passing through a suitable pulley 32 and communicating at its opposite end with a suitable latch 33, guided in a member 34 on the rear surface of the board and having a lug 35 adapted to engage over the wall of the guide 34 so as to hold the latch in a given position, say to normally hold the lug 28 in a rearmost position or out of a position where it will be contacted with by the operating handle 26 of the indicating member. A spring 36 is conveniently interposed in the housing 29 between the rear wall thereof and a collar 37 on the abutment 28, whereby to, as the latch 33 is released, force the abutment out into a position to actuate the indicator. The opening in the guide member 34 is sufficiently large to permit of the lug 35 to pass therethrough, when the latch is moved laterally, whereby to release the lug 35 and permit the bolt to move outwardly. This means for actuating the indicator is merely by way of illustration, since it is obvious that many different arrangements and constructions may be devised, for accomplishing this same result, and such modifications are within the contemplation of my invention.

The general operation of the construction will now be reviewed. The means for indicating the progress of the players may be either used with or without the ball indicating means, but to illustrate, say the ball has been moved up to the batter's box or home plate, and the player has hit the same, the ball will move out into one of the field positions, and the indicator A will simultaneously move from the home plate in the channel 8, and the contrasting color thereof will show through the foot print openings 7 thereby showing the progress of the player down to the first base. If the ball arrives at the first base before the player, the indicating disks will be in position to indicate "out." If, on the other hand, the player arrives at first base previous to the ball, the operator releases the latch 33 when the spring 36 will force the abutment 29 into the path of the operating handle 26, when the upper disk will be moved upon the lower one, so as to change the indications of the disk to thereby show that the player is "safe."

In the drawings, I have shown several of the indicators A as positioned on a single conveyer 12, so as to show the general effect and appearance of the indicator at the foot print openings and at the base openings, and I have also only shown the operating mechanism for but one conveyer. In practice, however, it is obvious that more than one conveyer will probably be used, so that there may be one indicator and conveyer for each runner, to the end that should more than one base be occupied, each indicator may be independently moved by its particular conveyer to thereby show the movement of each player along the base line. This involves merely a duplication of parts, as is obvious. Again, while the indicating means preferably takes the form of foot prints and is illustrated as showing the movement of players between bases, yet it is obvious that the indicating mechanism may take other forms, and is equally applicable in other connections, in the illustration of various factors of the game being produced.

What I claim is:—

1. In a ball bulletin board, the combination of a wall having on the front surface thereof a ball field representation, a series of foot print representations arranged progressively and in close succession, said representations being normally invisible at the front of the board, and means movable between the respective foot print representations for bringing visibly to view at a distance in front of the board succeeding print representations of the series.

2. In a ball bulletin board, the combination of a wall having on the front surface thereof a ball field representation, a series of foot print representations arranged progressively and in close succession, said representations being normally invisible at the front of the board, and means for bringing visibly to view at the front of the board succeeding print representations of the series to indicate the continuous movement of a player between the fixed positions on the field, said representations and said means lying within the plane of the front surface of the board.

3. In a ball bulletin board, the combination of a surface having thereon a field representation, and a member to the rear of said surface and of contrasting color with respect to that of the field, said member being movable to indicate the continuous movement of the player from one point to another and visible at the front of the board.

4. In a bulletin board, the combination of a surface having thereon a field representation and a series of closely associated openings having the general outline of a foot, and means positioned to the rear of said surface and successively movable to said opening to show through said openings and indicate the progress of a player.

5. In a game bulletin, the combination of a surface having depicted thereon a field representation, a movable member at the rear of said surface, said member being of contrasting color relative to said surface, and successively visible and invisible at the front of said surface at a number of points about said field representation to progressively illustrate the progress of a factor in the game.

6. In a base ball bulletin, the combination of a board having on the front surface, a base-ball diamond, means for showing the progress of a player between bases comprising foot print outlines, illuminating means therefor, and means operatively associated with and controlled by the movement of the last mentioned means to indicate whether or not the runner indicated by the foot prints is "safe."

7. In a base ball bulletin, the combination of a board having on the front surface a base-ball diamond, and means for showing the progress of a player between bases including an element movable between the bases, and means connected with the last mentioned element to indicate "safe" and "out" at the bases.

8. In a base ball bulletin, the combination of a board having on one surface, a ball diamond with base portions mechanical means movable between the bases for indicating the movement of a player between the base portions, said means being arranged at the rear of the front surface of the board, and means controlled by the last mentioned means to indicate whether or not a player is "safe."

9. In a ball bulletin, the combination of a ball field having portions thereof cut out in the form of foot prints, and an indicator arranged to the rear of the field and movable from one cut out part to another, to indicate successive steps of a player in action.

10. In a ball bulletin, the combination of a surface having a ball field representation, a movable indicator to the rear of the field, and successively visible and invisible through the field to indicate the progress of a factor in the game.

11. In a ball bulletin, the combination of a surface having a field representation, and a series of cut out portions separated from one another and extending between certain points on the field, and an indicator arranged to the rear of the field and successively moved under said cut out portions to indicate the progress of a factor between points on the field.

12. In a base-ball bulletin board, the combination of a member having on its front surface a field representation, a plurality of series of foot print outlines normally substantially invisible at the front of the board and movable means operating to make visible at the front of said member said foot print outlines, one series for the right foot and the other for the left foot.

13. In a ball bulletin, the combination of a plurality of boards having a space therebetween, the rear board having a groove extending between different points on the board, and connecting with the space between the boards, an indicator positioned in said space and visible through the front board, said indicator having an operating part projecting through the groove of the rear board.

14. In a ball game bulletin, the combination of a board having a field representation on the front surface thereof, and also having guide grooves in the rear surface thereof, extending to different points corresponding to points of the field on the front surface, and connecting with an enlarged channel or guide way between the front and rear surfaces of the board, an indicator positioned in the channel whereby it offers no obstruction beyond the front surface of the board, said indicator being viewable at the front of the board and of contrasting color with regard to the front surface of the board, an endless conveyer adapted to be connected with the indicator, and the indicator having a part guided in said grooves.

15. In a ball game bulletin, the combination of a board having a field representation on the front thereof, the rear surface thereof having guide grooves, and the board having a channel between the front and rear surfaces thereof connecting with said grooves, the rear surface of the board having an enlarged recess connecting with both the said channel and grooves, an indicator or indicators adapted to be inserted and removed through the enlarged recess and into the channel, and to be viewed from the front of the board, and means for moving the indicator in said channel along the grooves.

16. In a base ball bulletin, the combination of a field representation, having openings therethrough, an indicator positioned to the rear of the front surface of the field movable between the openings and adapted to show at said openings, said indicator comprising relatively movable indicating parts to indicate out or safe at the bases, and means for operating said parts.

17. In a ball bulletin, the combination of a field representation having openings therethrough, an indicator movable at the rear of the field representation between the openings and adapted to show through said openings, said indicator comprising relatively movable parts, and means for operating said parts, so as to indicate safe or out.

18. In a ball bulletin board, the combination of a board having on the front surface thereof a field representation with openings at the base portions of said field representations, and a plurality of closely associated openings between the base openings, and a single indicator positioned to the rear of the front surface of the board for indicating "safe" or "out" at the base openings and for showing the progress of a player between the bases by showing through said intermediate openings.

19. In a ball game bulletin, the combination of a board having on the front surface thereof a field representation, and having a plurality of series of openings one to the side of the other, and movable indicating means to the rear of said openings adapted to alternately display through succeeding openings in the plurality of series.

20. In a ball game bulletin, the combination of a board having on the front surface thereof a field representation, and having a plurality of series of openings one to the side of the other having the outline of foot prints, one series to represent the right foot prints and the other to represent left foot prints, the prints of one series being out of alinement with those of another series, an indicator movable at the rear of said openings adapted to alternately move from a position behind an opening in one series to a position behind the next succeeding opening in the other series, the indicator being of contrasting color with regard to that of the field.

21. In a ball game bulletin, the combination of a board having on the front surface thereof a field representation, and having a plurality of series of openings one to the side of the other having the outline of foot prints, one series to represent the right foot prints and the other to represent left foot prints, the prints of one series being out of alinement with those of another series, an indicator movable at the rear of said openings adapted to alternately move from a position behind an opening in one series to a position behind the next succeeding opening in the other series, the front at the base positions, and said indivator having a plurality of indicating means to display at said base openings.

22. A base-ball score board comprising a board provided with representations of a player, said representations being arranged in succession to represent said player as moving from one point to another, and an illuminant adapted to be moved in rear of said representations for the purpose set forth.

23. A base ball score board comprising a board provided with representations of a player, said representations being arranged in succession to represent said player as moving from one point to another, an illuminant for illuminating the representations, and means arranged in rear of the board for guiding the illuminant as it is moved in rear of said representations.

24. A base ball score board comprising a board provided on its outer face with the representation of a base-ball field and having slots extending from certain points on the field to other points thereon, material adapted to permit light to pass therethrough arranged over said slots, and an illuminant adapted to be moved along the slots as and for the purpose set forth.

25. A base ball score board comprising a board provided with representations of a player, said representations being arranged in succession to represent the player as moving from one point on the board to another, a second board arranged in rear of the first and provided with a slot lying in rear of the representations on the first board, and an illuminant adapted to be moved along the said slot.

In testimony whereof I affix my signature in presence of two witnesses.

JOHN WALLACE BAKER.

Witnesses:
MABEL E. HAMILTON,
WM. F. WATERBURY.